No. 669,313. Patented Mar. 5, 1901.
R. SEIDELINGER.
STAMP AFFIXING MACHINE.
(Application filed May 25, 1900.)
(No Model.) 6 Sheets—Sheet 1.

WITNESSES:
Edward Thorpe
C. R. Ferguson

INVENTOR
Rovie Seidelinger.
BY
ATTORNEYS

No. 669,313. Patented Mar. 5, 1901.
R. SEIDELINGER.
STAMP AFFIXING MACHINE.
(Application filed May 25, 1900.)
(No Model.) 6 Sheets—Sheet 3.

WITNESSES:
Edward Thorpe
C. R. Ferguson

INVENTOR
Robie Seidelinger.
BY
ATTORNEYS

THE NORRIS PETERS CO., PHOTO-LITHO., WASHINGTON, D. C.

No. 669,313. Patented Mar. 5, 1901.
R. SEIDELINGER.
STAMP AFFIXING MACHINE.
(Application filed May 25, 1900.)
(No Model.) 6 Sheets—Sheet 4.

WITNESSES:
Edward Thorpe
C. R. Ferguson

INVENTOR
Robie Seidelinger,
by Mann
ATTORNEYS

No. 669,313. Patented Mar. 5, 1901.
R. SEIDELINGER.
STAMP AFFIXING MACHINE.
(Application filed May 25, 1900.)
(No Model.) 6 Sheets—Sheet 5.
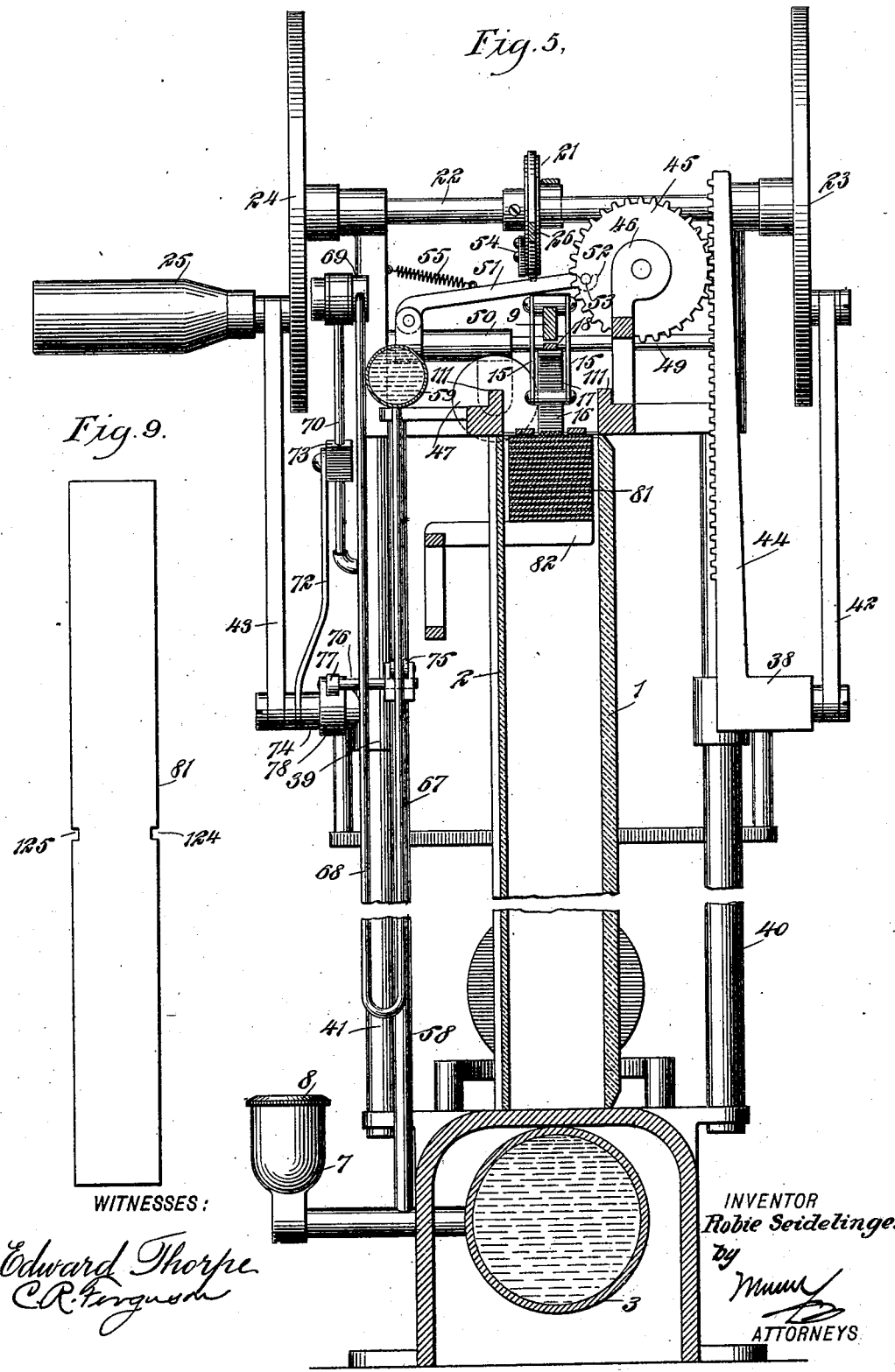
WITNESSES:
Edward Thorpe
C. R. Ferguson
INVENTOR
Robie Seidelinger.
by
ATTORNEYS No. 669,313. Patented Mar. 5, 1901.
R. SEIDELINGER.
STAMP AFFIXING MACHINE.
(Application filed May 25, 1900.)
(No Model.) 6 Sheets—Sheet 6.
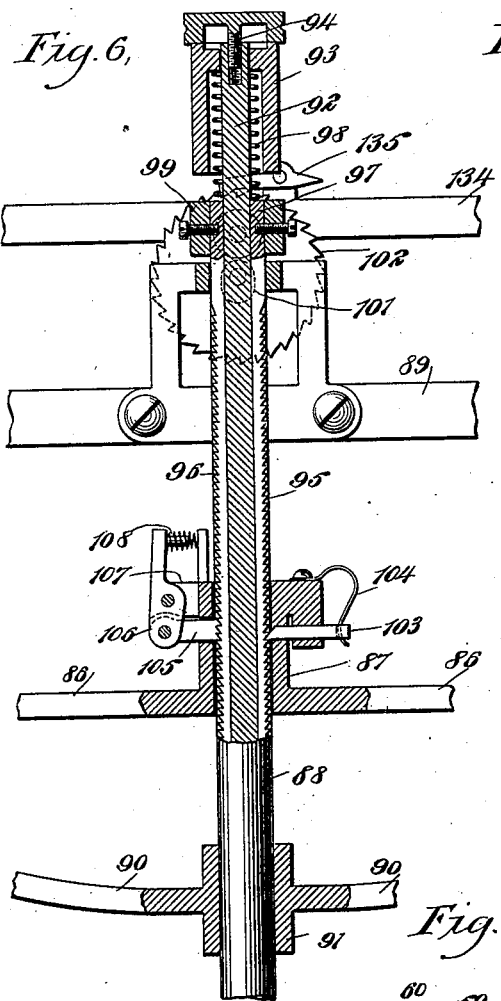
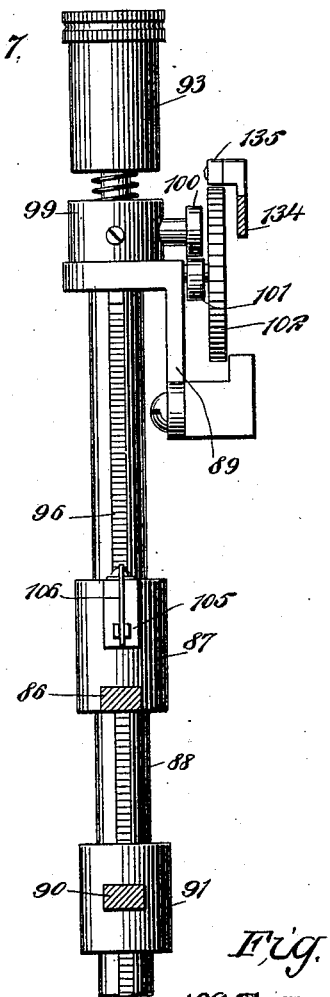
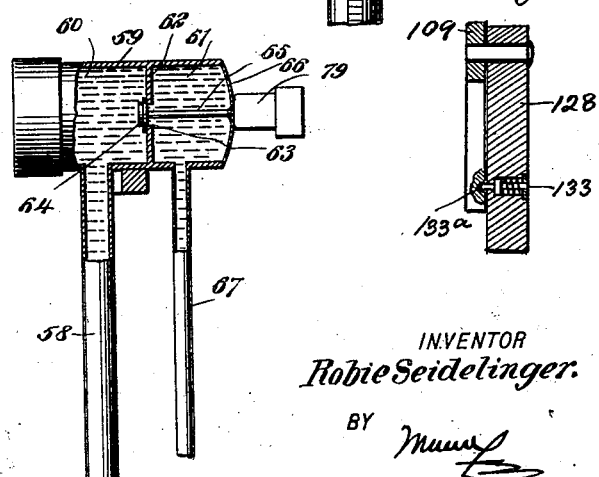
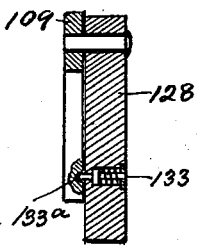
WITNESSES:
Edward Thorpe.
C. R. Ferguson
INVENTOR
Robie Seidelinger.
BY
ATTORNEYS
THE NORRIS PETERS CO., PHOTO-LITHO., WASHINGTON, D. C.

UNITED STATES PATENT OFFICE.

ROBIE SEIDELINGER, OF BOSTON, MASSACHUSETTS.

STAMP-AFFIXING MACHINE.

SPECIFICATION forming part of Letters Patent No. 669,313, dated March 5, 1901.

Application filed May 25, 1900. Serial No. 17,984. (No model.)

*To all whom it may concern:*

Be it known that I, ROBIE SEIDELINGER, a citizen of the United States, and a resident of Boston, in the county of Suffolk and State of Massachusetts, have invented a new and Improved Stamp-Affixing Machine, of which the following is a full, clear, and exact description.

This invention relates to improvements in machines for affixing postage-stamps to envelops or the like; and the object is to provide a machine by means of which the stamps may be automatically separated from the strips and rapidly attached to envelops or the like.

I will describe a stamp-affixing machine embodying my invention and then point out the novel features in the appended claims.

Reference is to be had to the accompanying drawings, forming a part of this specification, in which similar characters of reference indicate corresponding parts in all the figures.

Figure 1:
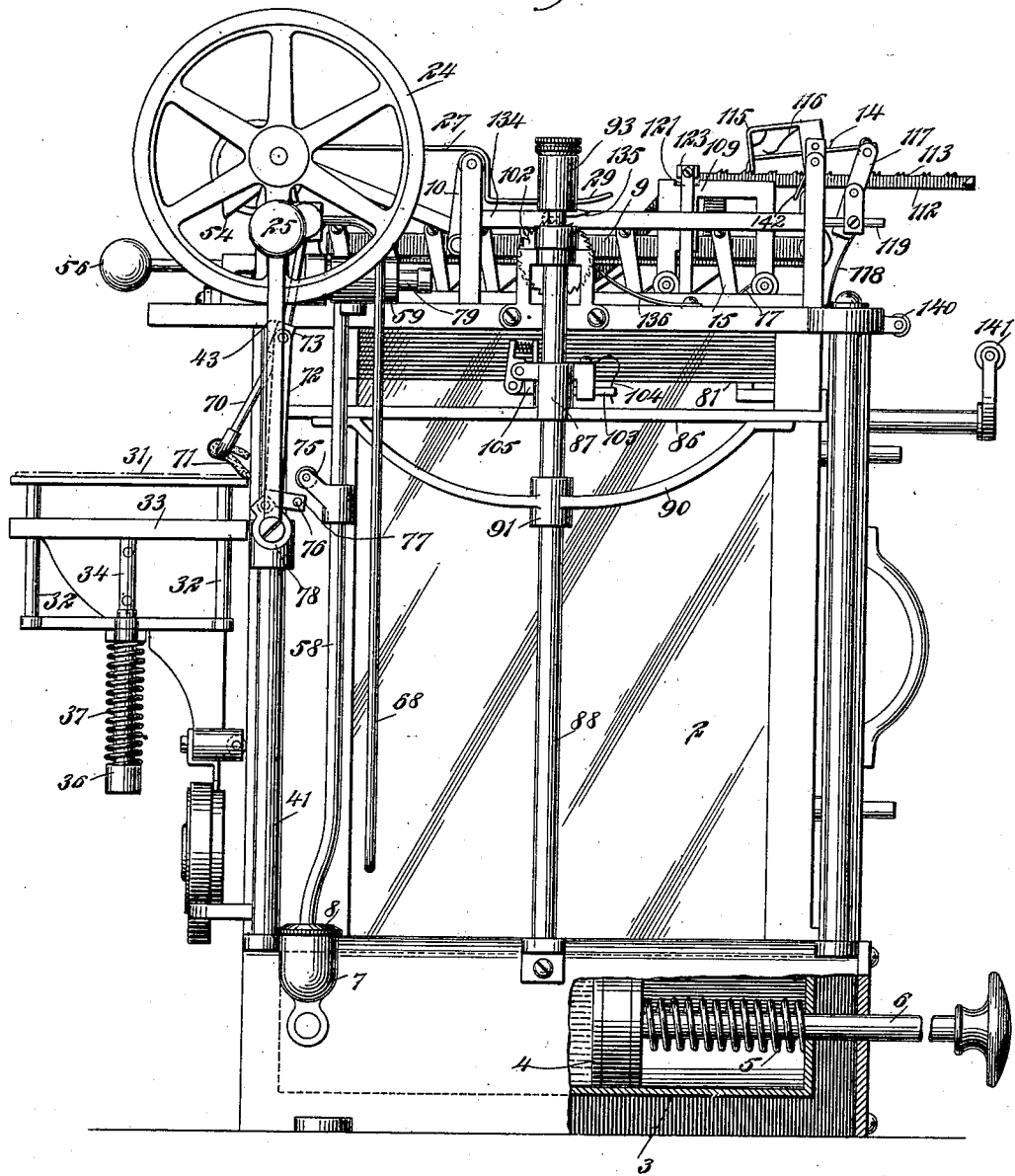
Figure 2:
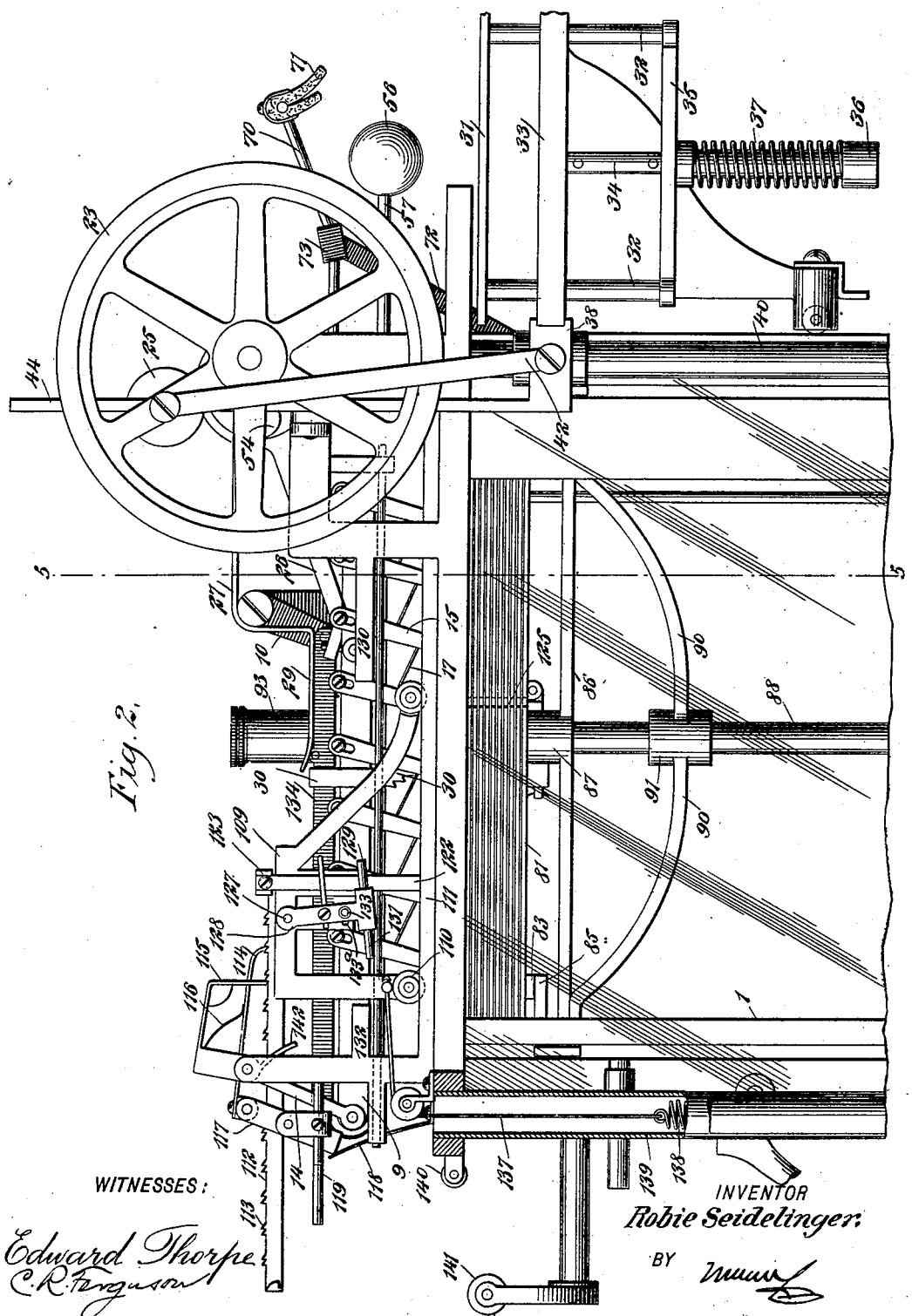
Figure 3:
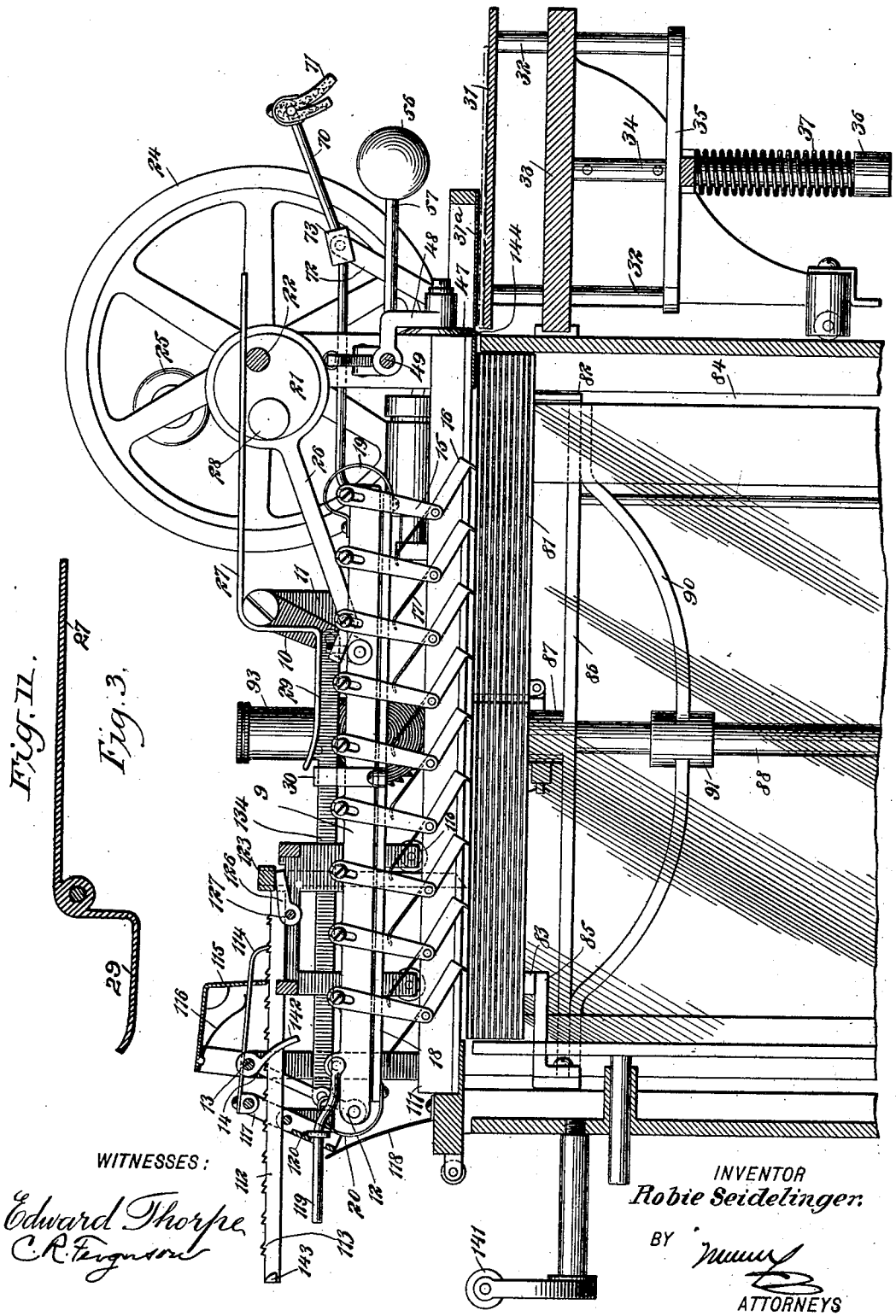
Figure 4:
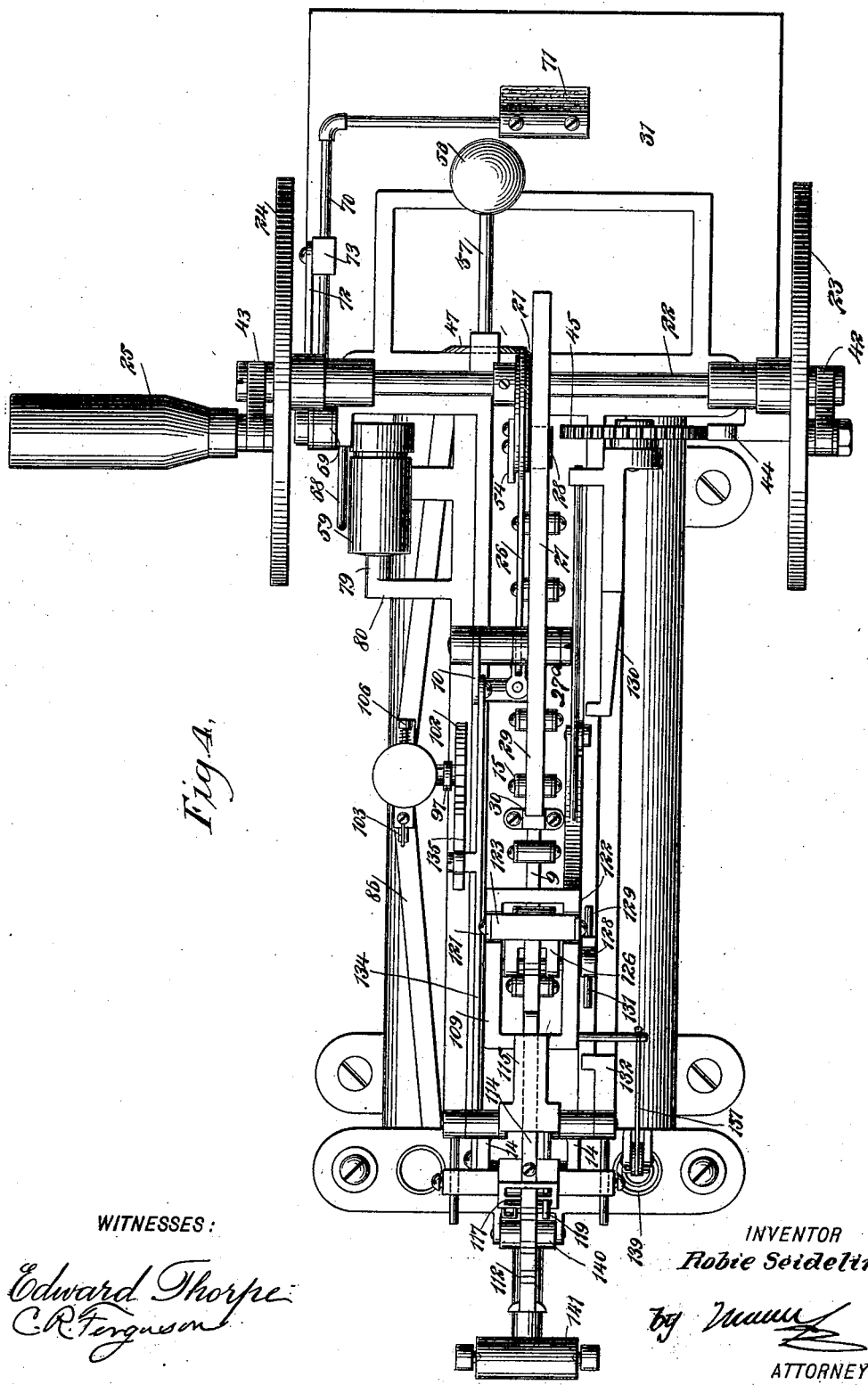

Figure 1 is a side elevation of a stamp-affixing machine embodying my invention. Fig. 2 is a side elevation, partly in section, of a portion of the machine and drawn on a larger scale than Fig. 1. Fig. 3 is a sectional elevation. Fig. 4 is a plan view. Fig. 5 is a section on the line 5 5 of Fig. 2. Fig. 6 is a sectional view showing an elevating device employed. Fig. 7 is a side view thereof. Fig. 8 is a sectional detail of a water-controlling valve employed. Fig. 9 is a plan view of one of the stamp-separating plates employed. Fig. 10 is a sectional detail showing a means for holding certain clutch-fingers employed, and Fig. 11 is a sectional detail of a lever employed in the machine.

The machine comprises a casing the side walls 1 2 of which are preferably made of glass, so that the pile of stamps arranged in the casing may be seen. One of these side pieces, here shown as the side piece 1, is adapted to slide outward, so that the stamps may be inserted. At the bottom of the casing is a water-cylinder 3, in which a piston 4 is automatically operated for forcing water outward to moisten the envelops before the stamps are affixed, as will be hereinafter described. This piston 4 is moved forward by means of a spring 5, surrounding the piston-stem 6, the said piston-stem being extended outward through the end of the cylinder and through a wall of the casing-base. Water is fed into the cylinder 3 through a cup 7, having a screw-cover 8.

Mounted to move with a reciprocating motion longitudinally over the top of the casing is a carrier-bar 9. This carrier-bar is supported near one end by a swinging arm 10, having pivotal connection with a post 11, and at the rear end it is connected to a swinging bar or frame 12, connected to a shaft 13, having bearings in uprights 14. Extended downward from and adjustably connected to the carrier-bar 9 is a series of arms 15, and to the lower end of each arm a push-pawl 16 is pivoted. The arms are slotted at the upper end, so that they may be adjustable vertically. These arms and push-pawls are located on each side of the bar 9, and each push-pawl has a rearwardly and upwardly extended spring-yielding finger 17, adapted to be engaged by a plunger-bar 18, having spring connections 19 and 20 at its ends with the bar 9, these springs being so arranged that the plunger-bar may be moved downward relatively to the carrier-bar, and the manner of accomplishing this movement will be hereinafter fully described.

Reciprocating motion is imparted to the carrier-bar 9 by means of an eccentric 21, arranged on a driving-shaft 22, on the outer ends of which are cranks or crank-wheels 23 and 23, one of which may be provided with a crank-handle 25. From the eccentric 21 an eccentric-rod 26 extends to a connection with the swinging arm 10, as plainly indicated in the drawings. Mounted to swing on the shaft to which each swinging arm 10 is connected is a lever having a forwardly-extended portion 27, adapted to be engaged by a stud 28 on one side of the eccentric 21 on the shaft 22, and this lever also has a portion 29 for engaging with a post 30, extended upward from the plunger-bar, as plainly indicated in Fig. 3. As shown in Fig. 4, the lever 27 is connected to a sleeve which turns on the shaft supporting the arms 10.

Arranged at the front of the casing and adapted to have spring-yielding vertical movement is a table 31, upon which the envelops or other matter to which the stamps are to be affixed are placed, and above the table is a platen 31ª, against which the stamps are pressed. This table 31 is supported on posts 32, movable through openings in a platform 33, and from this platform a rod 34 extends downward through a cross-bar or cross-bars 35, connecting the lower ends of the posts or rods 32. The lower end of the bar 34 has a head 36, and arranged between this head and the cross-bars of the table is a spring 37, acting to force the table upward. The platform 33 is connected to and extends outward from sleeves 38 39, movable on vertical guide-rods 40 41, fixed to the front of the machine. Up-and-down motion is imparted to the sleeves 38 and 39 to carry the platform and table upward by means of crank-rods 42 43, connecting at one end with sleeves 38 and 39 and at the other end with wrist-pins on the wheels 23 and 24, as indicated in Fig. 5.

Attached to the sleeve 38 and extended upward therefrom is a rack 44, engaging with a gear-wheel 45, having its shaft bearing in a standard 46 at the front of the casing, and this rack-bar, in connection with the gear-wheel, is designed to move a severing device over the perforations between two stamps to sever a stamp that has been projected out of the casing and placed upon an envelop. This severing device consists of a cutting-disk 47, connected to an arm 48, mounted to slide on a bar 49, connecting with the uprights in which the shaft 22 is journaled. This arm 48 is connected directly to a sleeve 50, which slides on the rod 49, and having vertical swinging connection with this sleeve is a draw-bar 51, having a hook end 52, in which a pin 53 on the front side of the gear-wheel 45 is designed to engage for moving the severing device in one direction. In the operation of this cutter or severing device when the rack 44 moves upward the wheel 45 will be rotated, and when the parts are in the position indicated in Fig. 5 or substantially in such position a cam 54, mounted on the side of the eccentric 21, will engage with the upper side of the draw-bar 51, forcing it slightly downward, so that its end will be moved downward to permit the pin 53 to move into the hook. When thus engaged, as indicated in Fig. 5, and upon a further rotation of the wheel 45, the draw-bar will be moved transversely, and consequently move the cutting device along a slot in the platen 31ª, as shown in Fig. 3, and over the stamp, severing the stamp from a strip. As the pin passes the opposite side it will become disengaged from the hook end of the draw-bar. Then a spring 55, connected at one end with the draw-bar 51 and at the other end to a fixed portion of the machine, will draw the severing device back to its normal position. (Indicated in Fig. 5.) It is obvious that the sleeve 50 will have a tendency to swing on the rod 49. Therefore to hold the severing-disk in proper engagement with the stamp a weight 56 is employed, this weight being attached to an arm 57, extended outward from the sleeve.

I will now describe a means for moistening an envelop or the like prior to placing a stamp thereon.

From the reservoir 3 a supply-pipe 58 extends upward and connects with a chamber of a valve-casing 59. This casing is divided into two chambers 60 and 61 by means of a partition 62, in which is an opening or valve-seat 63, normally engaged by a valve 64, the stem 65 of which is connected to an end 66 of the valve-casing, the said end being of resilient metal, so that it may yield sufficiently to open the valve, which will be hereinafter described. From the chamber 61 of the valve-casing a tube extends downward, as at 67, thence upward, as at 68, and the upper end of this portion 68 communicates with a cylinder 69, upon which a tube 70 is mounted to swing, and is adapted to receive water from said pipe 68 and the cylinder. Attached to the free end of the tube 70 is a moistening device 71, consisting of wick or other suitable material adapted to absorb water received from the tube. Swinging motion is imparted to the tube 70 by means of a link 72, having pivotal connection at one end with a block 73, attached to the tube, and at the other end with a stud 74, extended from the sleeve 39. In the operation of this portion of the device as the sleeves 38 and 39 are moved downward the link 72 will cause the tube 70 to swing downward, passing the moistening device 71 over the surface or portion of the surface of the envelop to which the stamp is to be affixed. During this downward movement a tappet 75, mounted on the pipe or tube 58, will be engaged by a pin 76, attached to a finger 77, extended from a collar 78, which is adjustably mounted on the stud 74. When the pin engages with the tappet or with a roller mounted thereon, the pipe 58 will be sprung slightly rearward, causing the yielding end of the valve-casing to strike against a lug 79, attached to an arm 80, extended outward from the machine-casing. This will cause the valve 64 to open, permitting the water which is under pressure from the piston to be forced into the chamber 61, and the water thus forced into this chamber will force the water contained in the tubes outward to the moistening device. Of course when the sleeves 38 and 39 move upward the moistening device will also be moved upward.

I will now describe a means for supporting and elevating several strips of stamps in the machine.

The several strips of stamps are arranged between metal plates 81, each having a width substantially equal to the width of the stamps and a length corresponding to the interior length of the casing. These separating-plates may consist of any suitable metal. I prefer, however, to employ aluminium for the sake of lightness. In any event the separating-plates should be lightly coated with mercury to prevent the adhesion of stamps thereto. When several layers of stamps and separating-plates are placed in the casing, they are to be put in the casing with the bottom plate resting on arms 82 83, which project from the casing. The arm 82 projects through a slot 84 in the side of the casing, while the arm 83 is mounted on a bracket 85, extended outward through an opening in the end of the casing, and this bracket, with the arm 83, is connected to an elevator-bar 86, which connects with a sleeve 87, adapted to slide on a guide-rod 88, extended upward from the base of the machine and supported at the top by a bracket 89, attached to the upper portion of the machine-casing. A brace-rod 90 has its ends attached to the elevator-bar 86 and also has connection with a sleeve 91, mounted to slide on the guide-rod 88. The guide-rod 88 has a reduced upper end 92, which is extended into a cap 93, to which it is secured by means of a screw 94. Mounted to slide in a channel at one side of the guide-rod 88 is a ratchet-rack 95, while on the opposite side of said guide-rod there is a fixed ratchet-rack 96. The ratchet-rack 95 has a collar 97 surrounding the reduced portion 92 of the guide-rod and having a slight movement thereon, and a spring 98, arranged within the cap 93, engages at one end with the upper end of the collar 97, while the upper end of said spring engages with the top wall of the cap at its inner surface. A collar 99 is attached to the collar 97, as here shown, by means of screws, and carried on this collar 99 is a roller 100, adapted to be engaged by a cam 101, arranged on the shaft of a ratchet-wheel 102, said shaft having a bearing in the bracket 89. The cam 101 is designed to give a slight upward movement to the rack 95 to carry the elevator upward at a certain time, as will be hereinafter described. Coacting with the rack 95 is a pawl 103, which extends through an opening in the sleeve 87 and is held yieldingly in engagement with the rack by means of a spring 104. Yieldingly engaging with the fixed rack 96 is a pawl 105, which is movable through an opening in the sleeve 87 and has its outer end connected to a lever 106, pivoted between lugs 107, extended from the sleeve 87. The pawl 105 is held in yielding engagement with the rack by means of a spring 108, bearing against the upper end of the lever 106.

I will now describe a means for imparting motion to the ratchet-wheel 102 and also operating to remove the separating-plates 81 from the machine after the several stamps placed thereon shall have been discharged. This means comprises a carriage 109, having rollers 110, engaging with tracks 111 on the casing. This carriage is designed to have a step-by-step forward motion imparted to it, each step being through the distance of the length of a stamp, or rather the distance between the perforations at opposite sides or ends of the stamps. Connected to the carriage and extended rearward therefrom is a bar 112, having teeth 113, of ratchet form, arranged on its top, the said teeth being in pairs. One tooth of a pair is adapted to be engaged by a push-pawl 114, while the other tooth of a pair is designed to be engaged by a stop-pawl 115. This stop-pawl 115 is spring-yielding, and the pawl 114 is held yieldingly in engagement with the bar by means of a spring 116. The pawl 114 has swinging connection with a swinging frame 117, to which it is engaged at its lower end by means of a returning-spring 118. The frame 117 is rocked in one direction to move the carriage forward by means of a push-rod 119, extended through an opening in a cross-bar of the frame and having a pivotal connection with the carrier-bar 9. The said rod 119 is provided with a collar 120 for engaging against the inner side of the frame, as indicated in Fig. 3. Carried by the carriage and movable vertically thereon are clutch-fingers 121 122, which are connected at the top by a cross-bar 123. The lower ends of these clutch-fingers are designed to be engaged in notches 124 125 in the opposite edges of the separating-plates for the purpose of removing said plates, as will be hereinafter described. The fingers are held normally in their upper position or while the carriage is moving forward by means of a finger 126 on a shaft 127, mounted in the carriage. Attached to this shaft 127 at one end is a swinging bar or arm 128, which has a forwardly-extended pin 129, adapted to engage with a fixed arm 130, and a rearwardly-extended finger 131, adapted to engage with a fixed arm 132 at the rear of the machine. The finger 126 is held to normally hold the clutch-fingers in their uppermost position by means of a spring-pressed pin carried by the arm 128 and engaging with a bar on the carriage 133. Connecting with the swinging frames 10 and 12 is a bar 134, carrying a pawl 135, engaging with a ratchet-wheel 102 and adapted to impart step-by-step motion thereto, and this wheel is held from backward motion by means of a spring-dog 136. The device for returning the carriage and the parts thereon to the normal position consists of a cord or like connection 137 between the carriage and a spring 138, arranged in a tubular upright 139 of the machine. It is obvious, however, that a weight may be employed instead of a spring. At the rear end of the machine are rollers 140 141, intended to guide the separating-plates while passing out of the machine. The roller 140 is adapted to bear upon the upper side of the plate, while the roller 141 engages with the under side thereof. The bar 115 is rigidly mounted on the shaft 13. Also rigidly connected to the shaft and extended downward at opposite sides of the bar 112 are trip-fingers 142, adapted to be engaged at a certain time by lugs 143 on the outer end of the bar 112 to move the dog out of engagement with the teeth of said bar.

The operation of the device is as follows: After placing the several stamps in the machine, the strips of stamps being separated by the metal plates, as before mentioned, upon a rotation of the shaft 22 the carrier-bar 9 will be moved forward, and as at this time the pointed ends of the fingers 16 are engaged in perforations of the stamp-strip lying upon the upper plate the strip will be moved forward until the stamp passes through an opening 144 in the front wall of the machine. Before this operation, however, the moistening device will have operated, as before described. The severing device will be moved across the strip to cut one of the stamps therefrom, and the stamp will then to be pressed against the platen and adhere to the envelop. As the shaft 22 continues to turn the carrier-bar will be moved in the reverse direction, and during this movement the portion 29 of the lever 27 by engaging with the upright 30 will force the plunger-bar 18 downward against the spring-finger 17, which will rock the points of the fingers 16 out of engagement with the stamp-strip. As soon, however, as the part 30 passes beyond the part 29 the said fingers will fall by gravity to engage the stamps, while the plunger-bar will be moved upward by the springs 19 and 20. During the movements of feeding the stamp-strip motion will be imparted to the ratchet-wheel 102, as before mentioned, and during the backward movement of the carrier-bar the shoulder 120 on the rod 119 by engaging with the frame 117 will rock the same, causing the pawl 114, engaging with a tooth on the bar 112, to move the carriage forward one step. As the carrier-bar again comes forward the spring 118 will rock the frame 117 to carry the pawl 114 rearward to engage with a new tooth of the bar. The carriage at this time will be held from backward movement by means of the pawl 115. At the time the last stamp of a strip is fed from the machine the carriage will have reached a position to bring its clutch-fingers 121 and 122 directly over the notches 124 and 125. Then the pin 129 will engage with the part 130, swinging the arm 128, causing the fingers 126 to rock and permit the clutch-fingers to move downward in the said notches. As the arm 128 is swung rearward the spring-pressed pin 133 will engage with a slight depression 133ª in a portion of the frame and temporarily hold the fingers 126 in a downward position, and they will again be moved upward when 131 strikes the part 132. Practically simultaneous with this action the lugs 143 will engage with the trip-fingers 142 and rock the pawl 115 out of engagement with the bar 112, permitting the carriage to be moved quickly backward by means of its spring 138, and this movement, of course, will carry the top plate 81 outward through an opening in the rear of the casing. As soon as this plate leaves the casing the pile of plates with the stamps thereon will be raised through the space of the thickness of one plate and its supported strip of stamps by the cam 101 engaging with the part 100, which will lift the rack-bar 95, and consequently moving the elevator upward. In this upward movement the pawl 105 will slide over the teeth of the fixed rack 196 and hold the elevator in its position. It will be noted that the inner end of the pawl 103 is beveled on the upper side, so that it may be moved outward as the rack 95 is moved downward to its normal position by means of the spring 98.

Having thus described my invention, I claim as new and desire to secure by Letters Patent—

1. A stamp-affixing machine, comprising an elevator for raising a series of stamp-strips, a cam operated by the machine for moving the elevator upward means for moving the top strip of stamps lengthwise by a step-by-step motion, and means for severing a projected stamp from the strip, substantially as specified.

2. A stamp-affixing machine, comprising an elevator for raising a series of stamp-strips in a casing, separating-plates arranged between the stamp-strips, means for moving the stamp-strips forward to feed out one stamp of a strip at a time, and means for removing a separating-plate from the casing after all the stamps of a strip shall have been removed therefrom, substantially as specified.

3. A stamp-affixing machine, comprising a casing, supporting and separating plates for the stamps, means for elevating said plates with the stamps in the casing, a series of fingers or pawls spaced apart for engaging in perforations of the stamp-strips, means for operating said fingers or pawls to move a strip forward, and means for raising said pawls or fingers upon their backward movement, substantially as specified.

4. A stamp-affixing machine, comprising a casing, an elevator adapted to operate in the casing, separating and supporting plates adapted to be elevated by said elevator, means for moving strips of stamps forward on the upper sides of the plates, means for severing a projected stamp, and means for discharging the plates one at a time, substantially as specified.

5. In a stamp-affixing machine, a series of metal plates adapted to separate strips of stamps, the said plates having recesses or notches between their ends and devices operated by the machine for engaging in the notches and removing the plates, substantially as specified.

6. In a stamp-affixing machine, a casing, means for feeding stamps therefrom, a reservoir arranged in the lower portion of the casing, a spring-pressed piston in said reservoir, a valve-casing having two chambers and a yielding end, a valve for controlling communication between the chambers and having connection with the yielding end of the valve-casing, a stop for engaging said yielding end, a pipe connection between one chamber of the valve-casing and the reservoir, and a moistening device having communication with the other chamber of said casing, substantially as specified.

7. In a stamp-affixing machine, a casing, means for feeding stamps therefrom, a moistening device, a reservoir, a spring-pressed piston in the reservoir, a valve-casing, a pipe connection between a chamber of said valve-casing and the reservoir, a pipe leading from another chamber of said valve-casing to the moistening device, a valve controlling communication between the two chambers, the said valve having its stem connected to a spring yielding end of the valve-casing, and means carried by a moving part of the machine for moving the valve-casing against a stop, whereby the valve is unseated, substantially as specified.

8. In a stamp-affixing machine, a casing, means for discharging stamps from the casing, means for elevating the stamps in the casing, a cutting-disk movable across the front of the casing, and means operated by the machine for causing the movements of the cutter, substantially as specified.

9. In a stamp-affixing machine, a casing, a series of metal plates for separating and supporting strips of stamps, an elevator movable in the casing for supporting and raising said plates with the stamps, a guide-bar at one side of the casing and on which said elevator is movable, a ratchet-rack movable lengthwise of said guide-bar, a pawl carried by the elevator and engaging with said rack, means for causing a vertical movement of said rack to raise the elevator, a stop or holding pawl for said elevator, and means for moving the stamp-strips out of the machine, substantially as specified.

10. In a stamp-affixing machine, a casing, an elevator movable in the casing, means for operating said elevator, a series of stamp-strip-supporting plates adapted to be supported on the elevator, a carriage movable on the upper side of the casing, means carried by said carriage for engaging with the metal plates after the stamps shall have been discharged therefrom, means for moving the carriage in a direction to discharge the plates, and means for feeding the strips of stamps forward one stamp at a time, substantially as specified.

11. A stamp-affixing machine, comprising a casing, means for supporting strips of stamps therein, a carrier-bar on the casing, means for imparting a longitudinal reciprocating motion to said bar, arms extended downward from the bar, fingers having swinging connection with said arms and adapted to engage with the stamp-strips, spring-fingers extended rearward from the stamp-engaging fingers, a plunger-bar having spring connection with the carrier-bar and adapted to move vertically with relation to the carrier-bar, and means for moving said plunger-bar downward to engage the spring-fingers, whereby the stamp-engaging fingers are moved out of engagement with the stamps, substantially as specified.

12. In a stamp-affixing machine, a casing, a plate or plates adapted to be arranged in the casing, means for moving said plate or plates vertically in the casing, means for moving stamps from said plate or plates, a carriage movable on the casing, fingers having vertical movement with relation to said carriage and adapted to engage in notches formed in the plate or plates, means for imparting a step-by-step forward movement to the carriage, and means for moving the carriage rearward to remove a plate, substantially as specified.

13. In a stamp-affixing machine, a casing, a series of stamp-supporting and separating plates, means for elevating the plates, a carrier-bar, means for imparting a reciprocating longitudinal motion to said bar, devices carried by said bar for engaging with stamps to move them along the top plate of the series, and a severing device operated by a movement of the machine, substantially as specified.

14. A stamp-affixing machine, comprising a casing, a series of plates for separating strips of stamps, means for elevating the plates in the casing, means for discharging stamps from the top plate of the series, means for pressing the stamp, and means actuated by a movement of the machine for removing the top plate of the series when the stamps shall have been removed therefrom, substantially as specified.

15. In a stamp-affixing machine, a casing, metal stamp-separating plates adapted to be placed in the casing, means for elevating said plates in the casing, means for feeding stamps from the plates, a carriage movable on the casing, a rack connected to the carriage, devices carried by the carriage for engaging with the metal plates, a pawl engaging with said rack, means for operating the pawl to move the rack and carriage forward, a stop or holding pawl for engaging with said rack, means carried by the rack for disengaging the holding-pawl, and means for moving the carriage rearward to remove a plate when said holding-pawl is released from the rack, substantially as specified.

16. In a stamp-affixing machine, a casing, means for moving a strip of stamps lengthwise in said casing to discharge one at a time, a cutting-disk movable across the front of the casing, a sleeve on which said disk is mounted, an arm pivoted to said sleeve and having a hook-shaped end, a gear-wheel, a pin on said gear-wheel for engaging in said hook-shaped end, a rack having engagement with the casing, and means for moving said rack upward to cause a movement of the cutting-disk in one direction, and a spring for moving the cutting-disk in the opposite direction, substantially as specified.

17. In a stamp-affixing machine, a casing, horizontal supporting devices in the casing for stamps, means for moving the stamps along the supporting devices to discharge stamps one at a time, means for severing a stamp from a strip, and means for successively removing the plates, substantially as specified.

18. In a stamp-affixing machine, a casing, a series of stamp-strip-supporting plates adapted to be arranged in the casing, a carrier-bar having reciprocating motion above the casing, fingers carried by said bar and adapted to engage in perforations in strips of stamps, a driving-shaft, an eccentric on said driving-shaft, a connection between said eccentric and the carrier-bar, a plunger-bar having spring yielding connection with the carrier-bar, and means operated by the eccentric for forcing said plunger-bar downward to disengage the fingers from the stamps, substantially as specified.

In testimony whereof I have signed my name to this specification in the presence of two subscribing witnesses.

ROBIE SEIDELINGER.

Witnesses:
J. WHITMAN BAILEY,
SIMON GOLDSMITH.